(12) United States Patent
Wang et al.

(10) Patent No.: US 11,925,292 B2
(45) Date of Patent: Mar. 12, 2024

(54) HOT AIR COOKING APPLIANCE

(71) Applicant: Instant Brands Holdings Inc., Downers Grove, IL (US)

(72) Inventors: Jiwei Wang, Ottawa (CA); Youlin Xie, Taizhou (CN); Yude Han, Zhejiang (CN)

(73) Assignee: Instant Brands Holdings Inc., Downers Grove, IL (US)

( * ) Notice: Subject to any disclaimer, the term of this patent is extended or adjusted under 35 U.S.C. 154(b) by 228 days.

(21) Appl. No.: 17/379,307

(22) Filed: Jul. 19, 2021

(65) Prior Publication Data

US 2022/0022689 A1 Jan. 27, 2022

(30) Foreign Application Priority Data

Jul. 22, 2020 (CN) .......................... 202010711877.7

(51) Int. Cl.
*A47J 37/06* (2006.01)
*F16B 1/00* (2006.01)
(Continued)

(52) U.S. Cl.
CPC ....... *A47J 37/0641* (2013.01); *A47J 37/0664* (2013.01); *F16B 1/00* (2013.01);
(Continued)

(58) Field of Classification Search
CPC ... A47J 37/0641; F24C 15/322; F24C 15/325; F24C 15/327; B65D 45/34; B65D 45/06; B65D 45/025
See application file for complete search history.

(56) References Cited

U.S. PATENT DOCUMENTS 4,734,562 A 3/1988 Amano et al.
5,630,507 A * 5/1997 Baker ..................... A61F 17/00
206/370
(Continued)

FOREIGN PATENT DOCUMENTS

CN 203234602 U * 10/2013
CN 104138222 A 11/2014
(Continued)

OTHER PUBLICATIONS

CN 206044408 U (Zhang, Yicheng) Mar. 29, 2017 [retrieved on Oct. 20, 2023]. Retrieved from Espacenet database, translation by EPO and Google. (Year: 2017).*

(Continued)

*Primary Examiner* — John J Norton
*Assistant Examiner* — Franklin Jefferson Wang
(74) *Attorney, Agent, or Firm* — Crowell & Moring LLP (57) ABSTRACT

Disclosed is a hot air cooking appliance comprising a base seat provided with a receiving chamber, the base seat is provided with a heating device and an air supply device capable of supplying and circulating hot air in the receiving chamber, the hot air cooking appliance is provided with an air exhaust port disposed distally from the air supply device, and during the process of cooking by the hot air cooking appliance, the water vapor generated in the receiving chamber is discharged into the atmosphere through the air exhaust port. The hot air cooking appliance of the present application is structurally simple and capable of reducing heat loss, noise, oily fume emissions, and indoor air pollution, as well as ensuring adequate amount of water vapor is generated to accomplish cooking.

20 Claims, 12 Drawing Sheets

(51) Int. Cl.
*F24C 15/02* (2006.01)
*F24C 15/20* (2006.01)
*F24C 15/32* (2006.01)
*B65D 45/24* (2006.01)

(52) U.S. Cl.
CPC ........ *F24C 15/021* (2013.01); *F24C 15/2007* (2013.01); *F24C 15/2035* (2013.01); *F24C 15/322* (2013.01); *B65D 45/24* (2013.01); *F16B 2200/83* (2023.08)

(56) References Cited

U.S. PATENT DOCUMENTS

| | | | | |
|---|---|---|---|---|
| 6,050,177 | A | * | 4/2000 | Lassig, Jr. ............. A47J 37/041 126/41 R |
| 9,980,605 | B2 | | 5/2018 | De Haas et al. |
| 2005/0223906 | A1 | | 10/2005 | Xu et al. |
| 2006/0254432 | A1 | * | 11/2006 | McLemore ......... A47J 37/1209 99/448 |
| 2009/0007798 | A1 | * | 1/2009 | Yamaguchi ........... F24C 15/327 219/401 |
| 2017/0231430 | A1 | * | 8/2017 | Moon ................. A47J 37/1266 99/331 |
| 2018/0035698 | A1 | * | 2/2018 | McNerney ............... A23L 5/17 |
| 2018/0255971 | A1 | | 9/2018 | Moon et al. |
| 2019/0059647 | A1 | | 2/2019 | Floessholzer |
| 2019/0110640 | A1 | * | 4/2019 | Te Velde ............ A47J 37/0641 |

FOREIGN PATENT DOCUMENTS

| | | | | | |
|---|---|---|---|---|---|
| CN | 103536188 | B | | 9/2015 | |
| CN | 204708660 | U | | 10/2015 | |
| CN | 206044408 | U | * | 3/2017 | |
| CN | 206371941 | U | | 8/2017 | |
| CN | 107713786 | A | | 2/2018 | |
| CN | 107822524 | A | | 3/2018 | |
| CN | 107898334 | A | | 4/2018 | |
| CN | 108552966 | A | | 9/2018 | |
| CN | 208048605 | U | | 11/2018 | |
| CN | 208463763 | U | | 2/2019 | |
| CN | 208582202 | U | | 3/2019 | |
| CN | 209003633 | U | | 6/2019 | |
| CN | 209018508 | U | | 6/2019 | |
| CN | 209058909 | U | | 7/2019 | |
| CN | 110215128 | A | * | 9/2019 | .......... A47J 37/0629 |
| CN | 209391737 | U | | 9/2019 | |
| CN | 209436989 | U | | 9/2019 | |
| CN | 209436989 | U | * | 9/2019 | |
| CN | 209437013 | U | | 9/2019 | |
| CN | 209518772 | U | * | 10/2019 | |
| CN | 110507217 | A | | 11/2019 | |
| CN | 209629508 | U | | 11/2019 | |
| CN | 209712616 | U | | 12/2019 | |
| CN | 110693338 | A | | 1/2020 | |
| CN | 111214133 | A | | 6/2020 | |
| EP | 3583878 | A1 | | 12/2019 | |
| FR | 3082412 | A1 | | 12/2019 | |

OTHER PUBLICATIONS

European Search Report for European Patent Application No. 21190397.6 dated Feb. 2, 2022, 8 pages.
U.S. Appl. No. 17/390,416, filed Jul. 30, 2021, Wang et al.
U.S. Appl. No. 17/390,450, filed Jul. 30, 2021, Han et al.
U.S. Appl. No. 17/390,488, filed Jul. 30, 2021, Wang et al.
European Search Report for European Patent Application No. 21185482.3 dated Dec. 8, 2001, 8 pages.

* cited by examiner

HOT AIR COOKING APPLIANCE

RELATED APPLICATIONS

The present application claims priority to Chinese Patent Application Number CN2020107118777, filed Jul. 22, 2020, the entirety of which is hereby incorporated by reference.

FIELD

The present application relates to a hot air cooking appliance and, more particularly, to a healthy and environmentally friendly hot air cooking appliance.

BACKGROUND

Air fryers are a new type of cooking appliance that require little or no edible oil, and use hot air to perform cooking. Compared to conventional fryers, air fryers are more in line with a healthy lifestyle of consuming less oil. However, prior art air fryers expel a large amount of heated air and produce very loud noise, and heated air with oily fumes may be bad for one's health.

Chinese Utility Model Patent Publication No. CN204708660U discloses an air fryer which uses a condensation module to lower the temperature of the hot air generated by cooking, and to reduce oily fume emissions into the atmosphere, but the hot blast system of this utility model faces the air outlet, resulting in loud noise, fast exhaust, and energy waste.

Chinese Utility Model Patent Publication No. CN209629508U discloses an air fryer provided with a separate fryer lid, and the fryer lid and the fryer body are sealingly disposed. It is declared in the description thereof that the utility model is capable of reducing oil fume emissions into the atmosphere, but since the utility model is without a fastening mechanism between the fryer lid and the fryer body, the pressure caused by the heat generated during cooking would push the fryer lid up and result in hot air emissions into the atmosphere. Therefore, the utility model does not have the effect of reducing oily fume emissions.

Chinese Utility Model Patent Publication No. CN209018508U discloses an air fryer provided with a plurality of oil-drip bulges disposed at the bottom of the frying basket for the condensation of greasy dirt in hot air to facilitate oil removal from hot air. The utility model uses a greasy dirt storage tank to collect the greasy dirt flowing from the oil-drip bulges and the greasy dirt in hot air to increase the working efficiency of the air fryer and improve the taste. The upper side of the circular oil accumulation ring is in contact with hot air, and the greasy dirt mingled with hot air is condensed in the circular oil accumulation ring, thereby having the greasy dirt in hot air removed. However, this patent does not disclose any air exhaust mechanism.

Chinese Invention Patent Publication No. CN107822524A discloses an air fryer with a vapor generator disposed at the position of the fryer lid, and the air fryer is provided with a liquid recovery tank (water storage box) disposed at the bottom thereof. While the patent does not disclose how hot air from cooking is exhausted, based on FIGS. 2 and 4 thereof, its air exhaust passage is directly facing the hot air fan. This results in fast heat dissipation, serious air pollution, and loud noise.

United States Patent Publication No. US20190059647 discloses an air fryer provided with a oily fume filtration device. However, the structure is complex and costly, its air outlet is also directly facing the exhaust mechanism, and that would result in loud noise.

BRIEF SUMMARY

The present application aims to overcome the above technical problems by providing a structurally simple, low-noise and low-oily-fume hot air cooking appliance that can ensure adequate amount of water vapor is generated to accomplish cooking.

The present application provides a hot air cooking appliance comprising a base seat provided with a receiving chamber and a frying barrel disposed in the receiving chamber, the frying barrel being provided with a cooking chamber configured to receive food to be cooked and an opening causing the cooking chamber to open upwards, the base seat being provided with a heating device and an air supply device capable of supplying and circulating hot air in the receiving chamber, the air supply device achieving hot air circulation by means of the opening and the air in the cooking chamber such that food in the receiving chamber is heated and cooked by the hot air, wherein: the inner side of the receiving chamber proximal to the air supply device is sealingly disposed; the base seat is provided with an air exhaust port disposed distally from the air supply device to reduce noise and oily fume emission; and during the process of cooking by the hot air cooking appliance, the water vapor generated in the receiving chamber is discharged into the atmosphere through the air exhaust port.

Compared to prior art designs using a fan to directly blow the air in the cooking chamber into the air exhaust port for air exhaust, the hot air cooking appliance of the present application makes use of thermal expansion created as a result of air expansion caused by heating and evaporation of water vapor to have water vapor discharged. It is structurally simple and capable of reducing heat loss, oily fume and indoor air pollution, and generates adequate amount of water vapor to accomplish cooking. Furthermore, the noise generated by the air supply device is released out of the hot air cooking appliance through the air exhaust port, and it is an important noise source of the hot air cooking appliance and because the air exhaust port is distal from the air supply device, the level of air supply device generated noise released through the air exhaust port is greatly lowered. Furthermore, in the prior art, a fan is employed to directly blow cooking-generated hot air to the air exhaust port, and since the air exhaust port is usually configured as a louver, the friction between the high-speed flow of cooking-generated hot air and the louver is another important noise source of the hot air cooking appliance. In the case of the present application, the arrangement whereby the air exhaust port is distal from the air supply device also greatly decreases this noise source. Therefore, the hot air cooking appliance of the present application greatly decreases these two noise sources and thereby causing the overall noise thereof to be greatly reduced.

As a further aspect, the base seat comprises an upper portion located on the upper side of the receiving chamber and a lower portion located beneath the lower side of the receiving chamber, the receiving chamber being formed by the upper portion and lower portion jointly surrounding it; the air supply device is disposed at the upper portion, the inner side of the upper portion being sealingly disposed; the air exhaust port is disposed at the lower portion; and the heating device is also disposed at the upper portion. In all prior art air fryers, the air exhaust port is disposed on the upper side of the receiving chamber to facilitate fast discharge of oily fume. This can facilitate fast exhaust of hot air, but it causes huge energy loss, and as the density of oily fume in the enclosed receiving chamber is higher than that of the water vapor, the oily fume tends to sink and arranging the air exhaust port at the lower portion better facilitates the exhaust of oily fume. Furthermore, as the heating device is also disposed at the upper portion, the temperature of the lower portion is lower and oily fume can precipitate in the cooking appliance, thereby reducing indoor air pollution.

As a further aspect, a cooling gap is formed outside the frying barrel, the air exhaust port being communicated with the cooling gap; the hot air generated in the cooking chamber passes through the cooling gap before passing through the air exhaust port to be discharged into the atmosphere; the air exhaust port is disposed at the bottom of the receiving chamber. The cooling gap is designed such that the gas therein does not take part in the hot air circulation in the cooking chamber, and it forms a thermal insulation layer outside the cooking chamber that is capable of reducing energy loss in the cooking chamber. In addition, a large area of cooling gap is very conducive to adequate cooling prior to the discharge of hot air so as to lower the temperature at which hot air is discharged into the atmosphere and to reduce the oily fume content when hot air is discharged into the atmosphere.

As a further aspect, the base seat is provided with a frying barrel inlet opening forwardly and communicated with the receiving chamber; the frying barrel is disposed as a drawer structure capable of being pushed into the receiving chamber from front to back through the frying barrel inlet; the front end of the drawer structure and the frying barrel inlet are sealingly disposed. The drawer structure is designed such that it allows for convenient operation by user.

As a further aspect, the drawer structure is provided with a face panel disposed at the front end thereof; the face panel is provided with a forward-facing appearance face provided with a handle to facilitate extraction and push of the drawer structure; the face panel is provided with a backward-facing rear surface; the base seat is provided with a forward-facing front surface disposed surrounding the frying barrel inlet; once the drawer structure is pushed backwards into the receiving chamber, the rear surface of the face panel and the front surface of the base seat are sealed, thereby achieving sealing between the front end of the drawer structure and the frying barrel inlet.

As a further aspect, a sealing ring is disposed between the rear surface of the face panel and the front surface of the base seat; the sealing ring is fixed on the rear surface of the face panel.

As a further aspect, a snap lock is disposed between both ends of the face panel and the corresponding ends of the base seat to strengthen the seal setting; the snap lock comprises a movable snap lock assembly fixed to the first member among the face panel or the base seat and a fastening hook disposed on the second member among the face panel or the base seat; the movable snap lock assembly comprises a wrenching component capable of rotating about a first rotary shaft and connected to the first member and a rotating fastener capable of rotating about a second rotary shaft and connected to the wrenching component; during connection, the wrenching component is first pulled distally from the outer side of the first member, the rotating fastener is then caused to fasten to the fastening hook, and the wrenching component is rotated proximally to the inner side of the first member until the line joining the point of application between the rotating fastener and the fastening hook and the second rotary shaft rotates from the outer side of the first rotary shaft to the inner side of the first rotary shaft, thereby achieving fastening between the face panel and the base seat. Such a design is capable of strengthening seals.

As a further aspect, the drawer structure is provided with a first magnetic component; the base seat is provided with a correspondingly matching second magnetic component; once the drawer structure is pushed into the base seat, a magnetic attraction force between the first magnetic component and the second magnetic component is generated to maintain sealing between the front end of the drawer structure and the frying barrel inlet.

As a further aspect, the first magnetic component is disposed on the rear side of the frying barrel, and the second magnetic component is disposed on the rear side of the receiving chamber. With this design, a single magnetic attraction can achieve sealing such that the number of magnetic components can be minimized.

As a further aspect, the first magnetic component is disposed on the rear surface of the face panel, and the second magnetic component is disposed on the front surface of the base seat. With this design, both sides of the face panel must be provided with magnetic components for more even force application and more reliable sealing.

As a further aspect, the base seat is provided with a slot disposed at the bottom thereof, with an air exhaust box extractable therefrom and insertable therein to dispose the air exhaust box therein; the air exhaust box is provided with a circuitous air exhaust passage disposed therein to facilitate cooling; once the air exhaust box is inserted into the slot, the air exhaust port is communicated with the air exhaust passage such that the hot air generated in the cooking chamber can pass through the air exhaust port and the air exhaust passage to be discharged into the atmosphere; the air exhaust box is formed by an upper air exhaust lid and a lower air exhaust lid assembled together; the air exhaust passage is in the form of a horizontal ring and jointly surrounded by the upper air exhaust lid and the lower air exhaust lid; the upper air exhaust lid and the lower air exhaust lid can be disassembled to facilitate cleaning.

As a further aspect, the lower air exhaust lid is provided with a water drainage hole; a water storage box is provided beneath the air exhaust passage so that condensed water flowing through the water drainage hole flows into the water storage box.

DETAILED DESCRIPTION

Here the exemplary embodiments will be described in detail with reference to the accompanying drawings. Unless otherwise stated in the description of the accompanying drawings, it is to be noted that same numerals represent the same or similar elements. The exemplary embodiments described below do not represent all embodiments consistent with the present application. On the contrary, they are merely examples of devices consistent with some aspects of the present application described in detail in the appended claims.

The terms used in the present application are merely intended to describe specific embodiments instead of limiting the present application. Unless otherwise defined, the technical or scientific terms used in the present application shall have ordinary meanings commonly understood by persons of ordinary skills in the art. The terms "first", "second" and the like used in the description and claims of the present application do NOT indicate any sequence, quantity or importance, but are intended to identify different constituent parts. Similarly, words such as "one" or "a" also do NOT indicate quantity limits, but indicates the presence of at least one. "A plurality of" or "several" indicate two or more. Unless otherwise indicated, the terms "front section", "rear section", "lower section" and/or "upper section" and the like are merely intended for facilitating illustration, instead of limiting to a location or spatial orientation. The terms "comprises" or "includes" and the like are intended to refer to the components or items appearing before the words "comprises" or "includes", including the components or items appearing after the words "comprises" or "includes" and their equivalence, and do NOT exclude other components or items. The terms "connect" or "link" and the like are not limited to physical or mechanical connections, and may include electrical connections, be they direct or indirect. Unless otherwise clearly defined by context, the singular forms "a", "the" and "that" used in the description and claims of the present application are intended to include the plurals. It must also be understood that the words "and/or" used herein refer to and include any and all possible combinations of one or a plural number of associated listed items.

As shown in FIGS. 1-5, a hot air cooking appliance of the present application is disclosed as an air fryer 100, and it may be designed as an oven with an air fryer function. Specifically, the air fryer 100 comprises a base seat 20 provided with a receiving chamber 240 and a frying barrel 42 disposed in the receiving chamber 240. The frying barrel 42 is provided with a cooking chamber 420 configured to receive food to be cooked and an opening (not numbered) causing the cooking chamber 420 to open upwards. The base seat 20 comprises an upper portion 22 located on the upper side of the frying barrel 42 and a lower portion 24 located beneath the lower side of the frying barrel 42, the receiving chamber 240 of the frying barrel 42 being formed by the upper portion 22 and lower portion 24 jointly surrounding it. The upper portion 22 is provided with a heating device 224 and an air supply device 222 capable of supplying and circulating hot air in the cooking chamber 420. The upper portion 22 is sealingly disposed facing the inner side of the cooking chamber 420, and the air fryer 100 is provided with an air exhaust port 244 disposed distally from the position of the air supply device 222. During the process of cooking by the air fryer 100, the water vapor generated in the cooking chamber 420 is discharged into the atmosphere through the air exhaust port 244. In prior art designs, the air exhaust port is usually disposed directly facing the position of the air supply device such that the water vapor generated by cooking can be rapidly discharged into the atmosphere, such that is easy to produce cooked food that is tender with a crispy crust. However, that will result in more energy loss and waste, and because high-speed hot air is blown by the air supply device to an irregular air outlet, friction noise is generated by the high-speed air flow. The air exhaust port 244 is disposed distally from the position of the air supply device 222. So long as the air outlet is distal from the air supply device as in the case of the centrifugal fan of the air supply device shown in the figures of the present application, where it is not disposed beyond the horizontal direction of the circumference of the centrifugal fan, air exhaust noise and heat loss can be reduced and energy saved. Sealing of the inner side of the upper portion is also relative, so long as there is no distinct air outlet will do, and as for the assembly clearance present in the axial direction of the fan, complete sealing is not required. Of course, if a small air outlet is disposed on the inner side of the upper portion, since the noise generated is very low and the air displacement is little, and/or if other air outlets are provided distally from the air supply device, such designs have in effect adopted the creative substance of this application and should fall within the scope of protection thereof.

Figure 1:
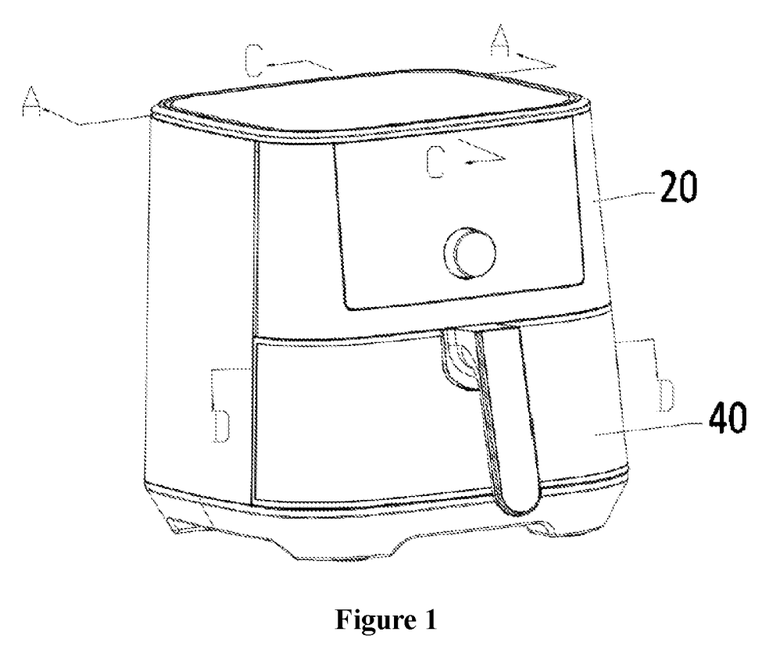
FIG. 1 is an isometric view of an embodiment of a hot air cooking appliance of the present application.
Figure 2:
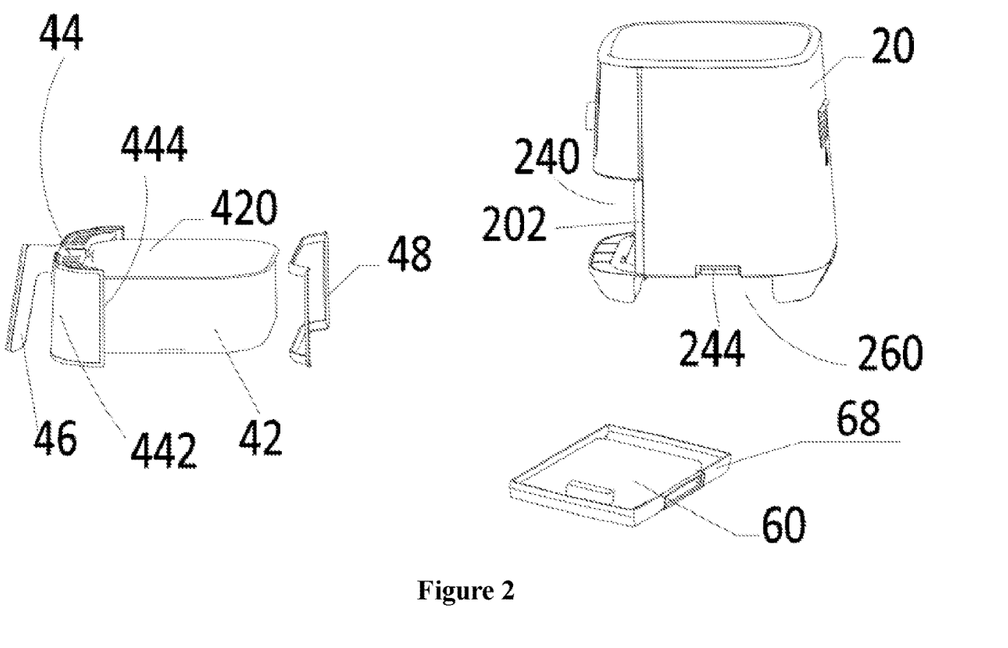
FIG. 2 is an exploded view of the hot air cooking appliance shown in FIG. 1.
Figure 3:
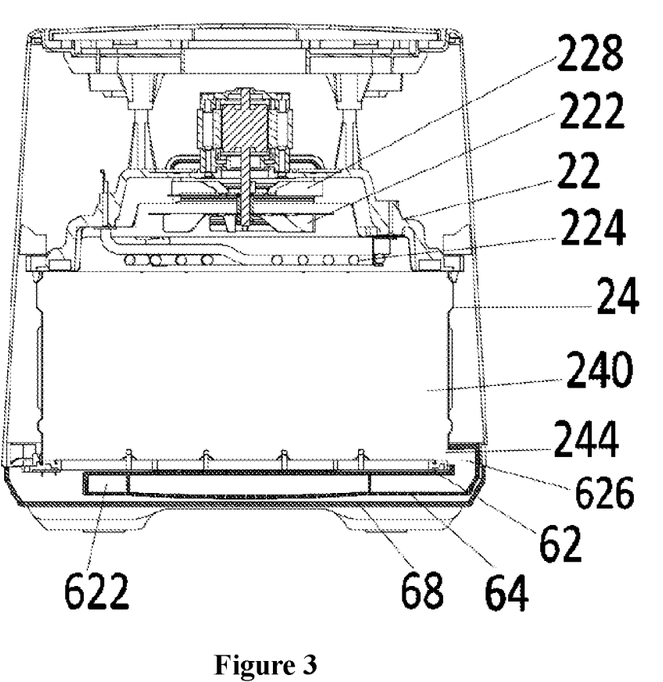
FIG. 3 is a sectional view along A-A of the hot air cooking appliance shown in FIG. 1, wherein the drawer structure is not shown.

As a further aspect, a cooling gap 424 is formed between the side wall and bottom wall of the fryer barrel 42 and the inner wall of the receiving chamber 240 (refer to FIGS. 11 and 12 in combination), and the air exhaust port 244 is communicated with the cooling gap 424. Because the opening of the fryer barrel 42 is not sealed to the upper portion 22 of the base seat 20, the hot air generated during cooking can flow from the inner side of the side wall of the fryer barrel 42 through the opening of the fryer barrel 42 into the cooling gap 424 on the outer side of the side wall of the fryer barrel 42 before being discharged into the atmosphere through the air exhaust port 244. To facilitate cooling of the hot air exhaust for the precipitation of oily fume and water vapor in the hot air to prevent indoor air pollution, the longer the cooling gap the better precipitation will be. Therefore, the air exhaust port 244 of the present application is disposed at the lower end of one side of the receiving chamber 240 (as shown in FIG. 3). Furthermore, as an alternative design, the air exhaust port may be disposed at the bottom of the lower portion 24 (not shown in figures) such that the length through which the hot air flows is through the cooling gap 424 before the discharge of hot air out of the air outlet. As another alternative design, the cooling gap may be disposed between the face panel and the fryer barrel with the air outlet disposed on the face panel and connected to the cooling gap.

The embodiments shown in the figures of the present application disclose a drawer-type air fryer, i.e. the base seat 20 is provided with a frying barrel inlet opening (not numbered) forwardly and communicated with the receiving chamber 240, and the frying barrel 42 is disposed as a drawer structure 40. The drawer structure 40 is provided with a face panel 44 disposed at the front end thereof; the face panel 44 is provided with a forward-facing appearance face 442 provided with a handle 46 to facilitate extraction and push of the drawer structure 40. By operating the handle 46, the drawer structure 40 can be conveniently pushed into the receiving chamber 240 from front to back through the frying barrel inlet; and the front end of the drawer structure 40 and the frying barrel inlet are sealingly disposed, thereby preventing high-temperature hot air in the cooking chamber 420 from being directly discharged into the atmosphere. The face panel 44 is provided with a backward-facing rear surface 444; a sealing ring 48 is disposed between the rear surface 444 of the face panel 44 and the front surface 202 of the base seat 20; once the drawer structure 40 is pushed backwards into the receiving chamber 240, the sealing ring 48 is compressed and deformed, thereby sealing the rear surface 44 of the face panel 44 and the front surface 202 of the base seat 20. The present application can have many other embodiments, e.g. the base seat of the air fryer can be designed as a structure with the lower portion and the upper portion separated from each other, in which case the structure of the lower portion is disposed like a base seat of an electric cooker while the structure of the upper portion is disposed like a lid of an electrical cooker, with the fryer designed like an inner pot of an electric cooker. As this structure is without a drawer and its operation is inconvenient, its details are not described herein.

Due to the provision of the sealing ring 48 between the drawer structure 40 and the base seat 20, forward and backward applied forces are generated between the drawer structure 40 and the base seat 20, and to overcome these forces, positioning slots and positioning ribs (not shown) are disposed between the drawer structure 40 and the base seat 20. To better ensure better sealing between the drawer structure 40 and the base seat 20, as shown in FIGS. 6-10, a snap lock 80 is disposed between both ends of the face panel 44 and the two corresponding ends of the base seat 20. The snap lock 80 comprises a movable snap lock assembly 82 fixed to the first member among the face panel 44 or the base seat 20 and a fastening hook 88 disposed on the second member among the face panel 44 or the base seat 20; the movable snap lock assembly 82 comprises a wrenching component 822 capable of rotating about a first rotary shaft 820 and connected to the first member and a rotating fastener 826 capable of rotating about a second rotary shaft 824 and connected to the wrenching component 822; the rotating fastener 826 is provided with a movable hook 828 disposed at the end thereof. During connection, the wrenching component 822 is first pulled distally from the outer side of the first member, the rotating fastener 826 is then caused to fasten the movable hook 828 to the fastening hook 88, and the wrenching component 822 is rotated proximally to the inner side of the first member until the line joining the point of application between the movable hook 828 and the fastening hook 88 and the second rotary shaft 824 rotates from the outer side of the first rotary shaft 820 to the inner side of the first rotary shaft 820, thereby achieving fastening between the face panel 44 and the base seat 20. In order to save space, the design of the first member in the embodiment shown is designed as a base seat 20, however in circumstances where space allows, the drawer can be designed as the first member.

Figure 11:
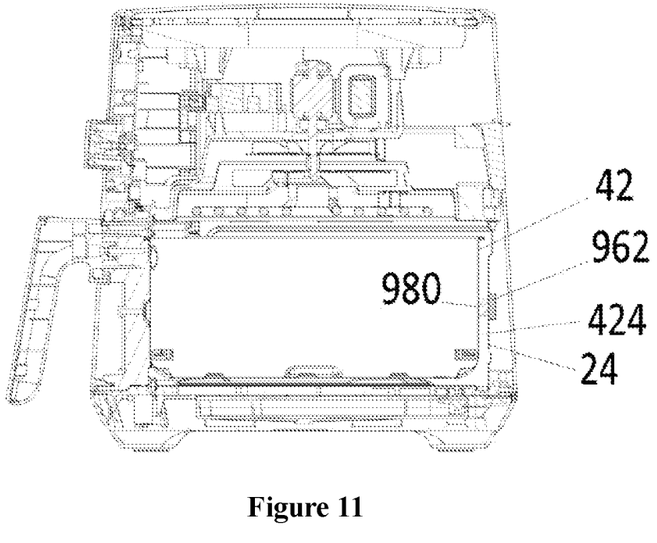
FIG. 11 is a sectional view along C-C of the hot air cooking appliance shown in FIG. 1 added with two magnetic components correspondingly matching each other.
Figure 12:
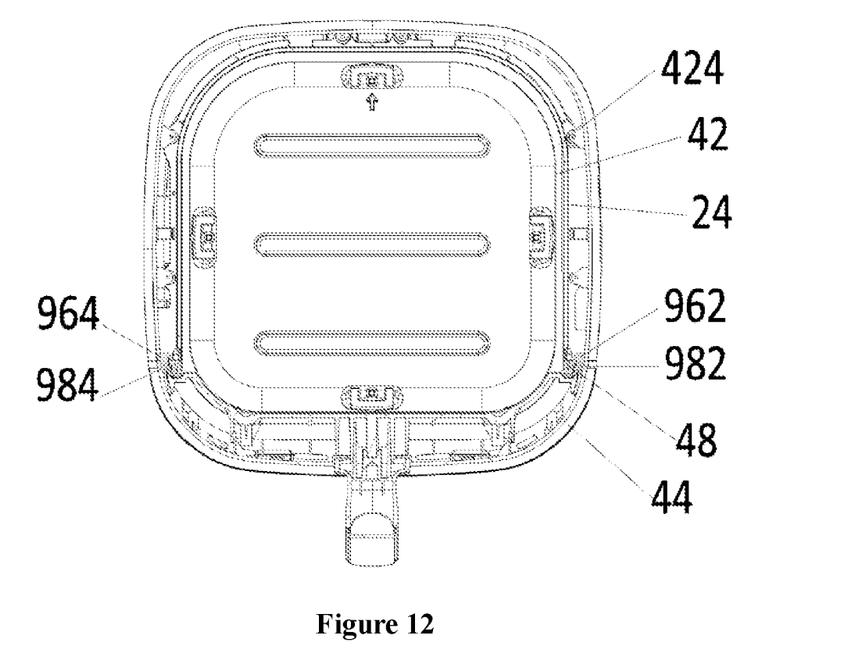
FIG. 12 is a sectional view along D-D of hot air cooking appliance shown in FIG. 1 added with two magnetic components correspondingly matching each other.

Furthermore, to overcome the generation of forces separating from each other between the drawer structure 40 and the base seat 20, magnetic attraction can also be used, i.e. the drawer structure is provided with a first magnetic component; the base seat is provided with a correspondingly matching second magnetic component; once the drawer structure is pushed into the base seat, a magnetic attraction force between the first magnetic component and the second magnetic component is generated to maintain sealing between the front end of the drawer structure and the frying barrel inlet. The specific locations of the first magnetic component and the second magnetic component may be arranged as shown in FIG. 11 where the first magnetic component 980 is disposed on the rear side of the frying barrel 42, and the second magnetic component 960 is disposed on the rear side of the receiving chamber. The specific locations of the first magnetic components and the second magnetic components may also be arranged as shown in FIG. 12 where the first magnetic component 982, 984 are disposed on the rear surface 446 of the face panel 44, and the second magnetic components 962, 964 are disposed on the front surface 202 of the base seat 20. Furthermore, the first magnetic components and the second magnetic components can be in many forms, e.g. permanent magnets or electromagnets. When permanent magnets are used, the connection/termination or reversed control of electrical power can determine the presence and absence of magnetic attraction forces or provide an outward push force to the drawer structure to facilitate the extraction thereof.

Figure 4:
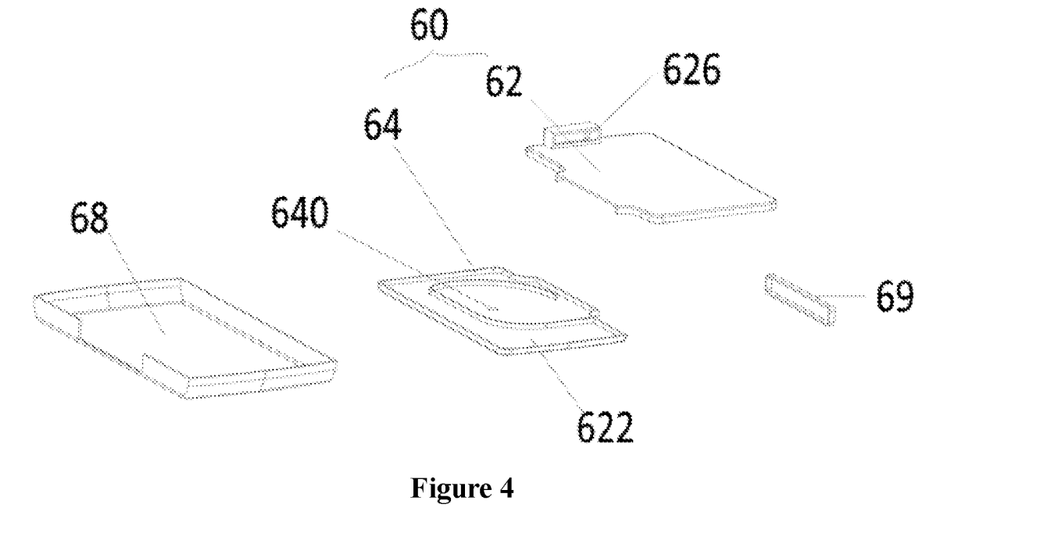
FIG. 4 is an exploded view of the air exhaust box and water storage box shown in FIG. 2.
Figure 5:
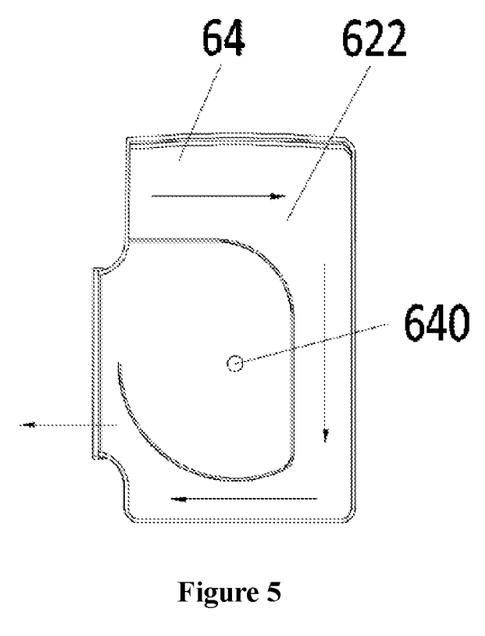
FIG. 5 is a top view of the lower air exhaust lid shown in FIG. 4.
Figure 6:
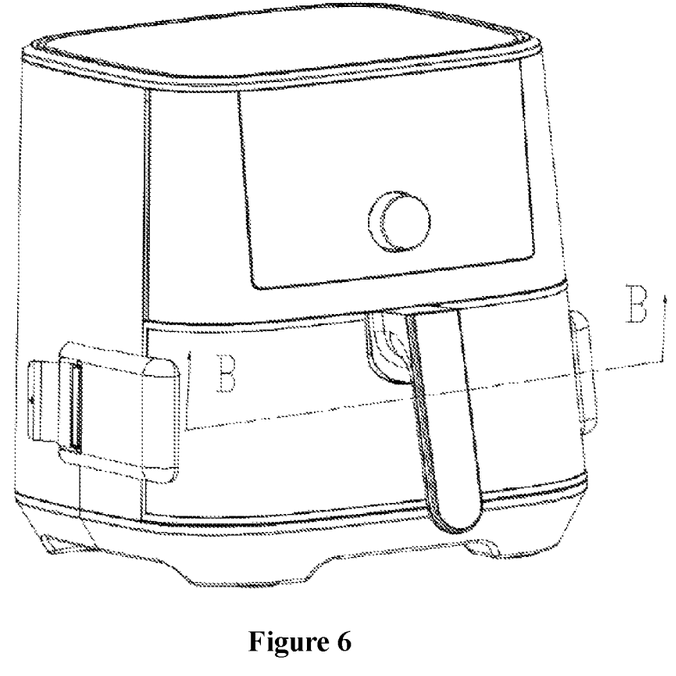
FIG. 6 is an isometric view of the hot air cooking appliance shown in FIG. 1 with a snap lock added (in the connected position).
Figure 7:
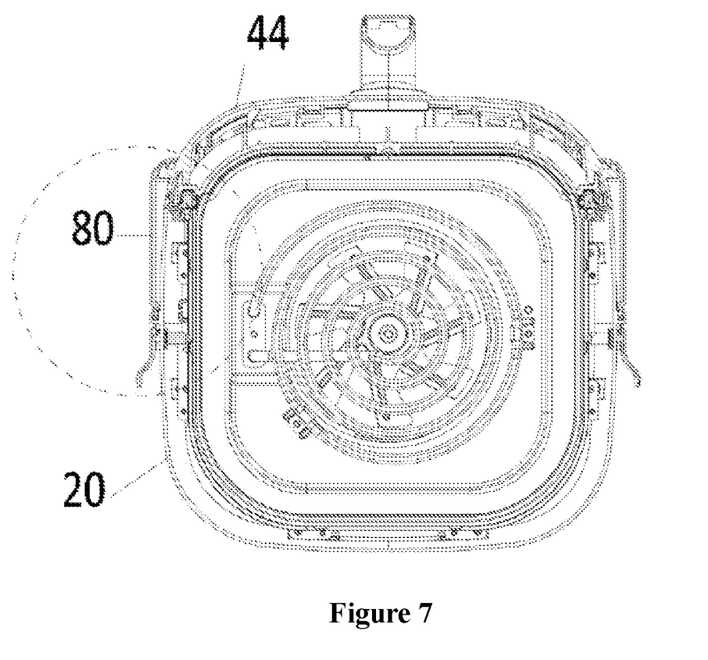
FIG. 7 is a sectional view along B-B of the hot air cooking appliance shown in FIG. 6.
Figure 8:
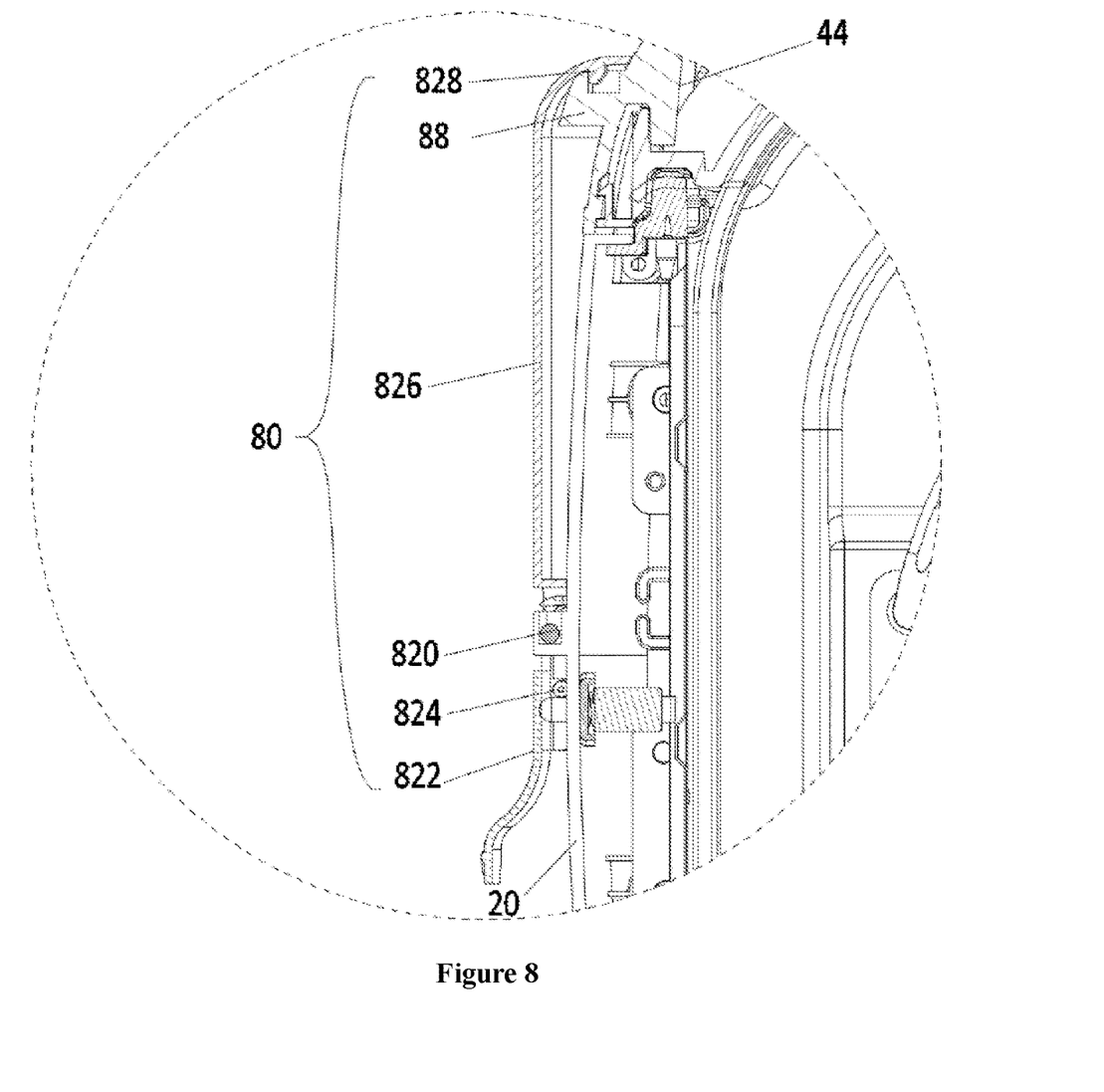
FIG. 8 is a partial enlarged view of the circled portion shown in FIG. 7.
Figure 9:
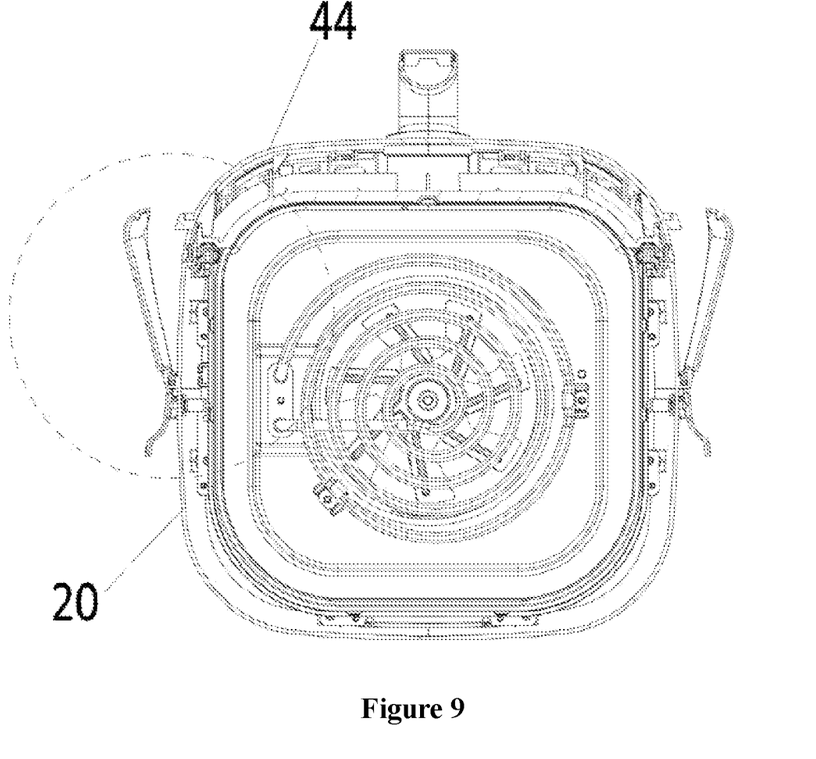
FIG. 9 is a sectional view of the snap lock of the hot air cooking appliance shown in FIG. 7 in an open position.
Figure 10:
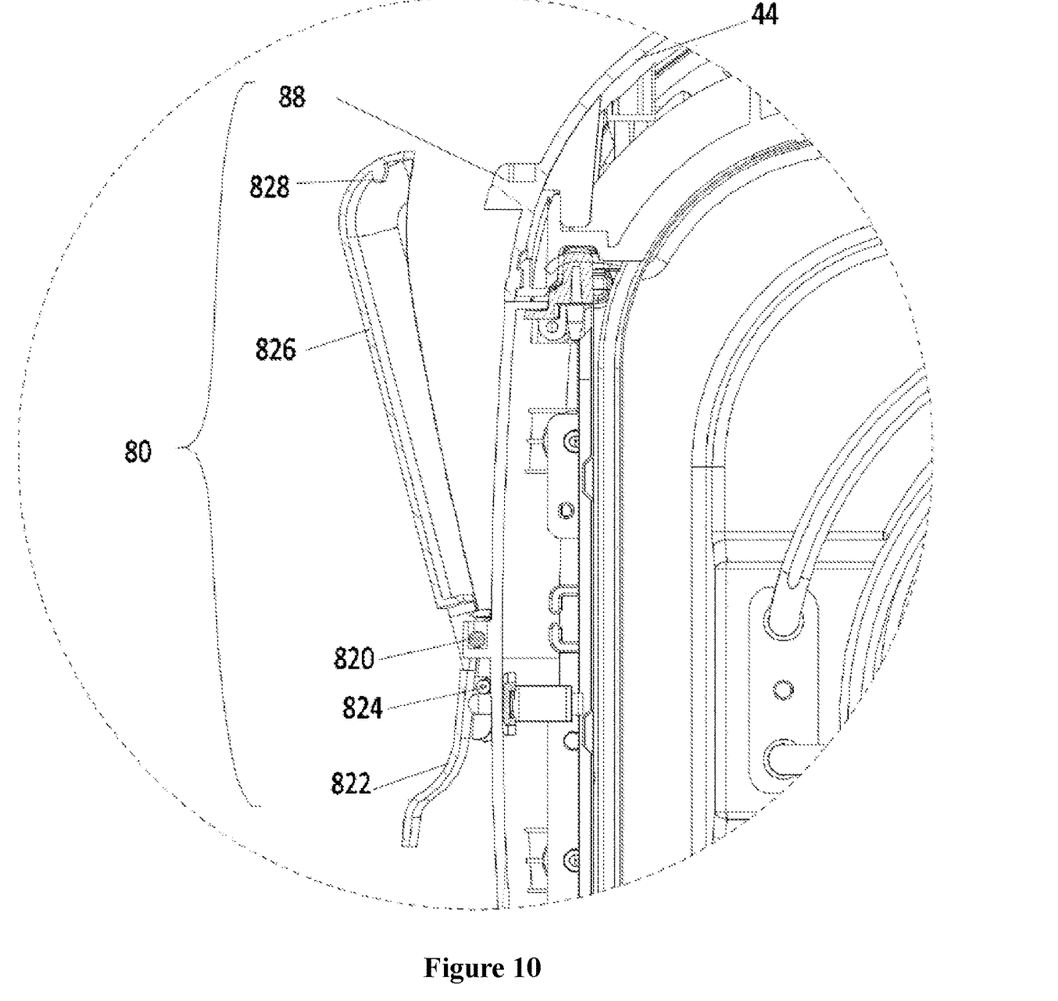
FIG. 10 is a partial enlarged view of the circled portion shown in FIG. 9.

As shown in FIGS. 3-5, the base seat 20 is provided with a slot 260 disposed at the bottom thereof, with an air exhaust box 60 extractable therefrom and insertable thereinto disposed therein. The air exhaust box 60 is provided with a circuitous air exhaust passage 622 disposed therein to facilitate cooling of hot air. Once the air exhaust box 60 is inserted into the slot 260, the air exhaust port 244 is communicated with the air exhaust passage 622 via a connection 626, such that the hot air generated in the cooking chamber 420 can pass through the air exhaust port 244 and the air exhaust passage 622 to be discharged into the atmosphere. The air exhaust box 60 is formed by an upper air exhaust lid 62 and a lower air exhaust lid 64 assembled together and can be disassembled to facilitate cleaning. The air exhaust passage 622 is in the form of a horizontal ring and jointly surrounded by the upper air exhaust lid 62 and the lower air exhaust lid 64. The lower air exhaust lid 64 is provided with a water drainage hole 640 disposed on the inner side of the circuitous air exhaust passage 622; a water storage box 68 is provided beneath the air exhaust box 60 so that condensed water flowing through the water drainage hole 640 flows into the water storage box 68. The water storage box 68 is provided with an air exhaust seal 69 disposed at the connection 626 with the air exhaust passage 622. Furthermore, to reduce the number of structural components, the capacity of the lower air exhaust lid 64 may be enlarged to be also used for water storage (without designing a water drainage hole) so as to facilitate cleaning and increase water storage. The shown embodiments of the present application merely illustrate arrangement of the air exhaust passage at the bottom of the base seat, while in other embodiments, the air exhaust passage may also be designed to be on the face panel of the drawer structure or on the side wall of the lower portion, or even on the upper portion, so that the air exhaust passage is proximal to the cooling fan 228 of the electric motor (refer to FIG. 3), thereby facilitating cooling of the air exhaust passage by means of the cooling fan.

Comparison tests of frozen potato chip frying were performed on a Walmart Inc.'s Vortex™ Plus 6 Quart Air Fryer (whose air exhaust port is directly facing the air supply device, hereinafter referred to as "the product available in the market"), and the structure of the present application, for a period of 15 minutes. It was discovered that the noise generated by the product available in the market under stable operation was above 60 dB, the maximum PM2.5 test data thereof was 120 μg/m³ and the final dehydration rate of the potato chips produced thereby was 45%. On the other hand, the noise generated by the product of the present application under stable operation was 56.5 dB, the maximum PM2.5 test data thereof was 25 μg/m³ and the final dehydration rate of the potato chips produced thereby was 42%. By and large, the noise generated by the product of the present application was greatly reduced, the oily fume emission was greatly reduced and the dehydration rate was also decreased, without the taste being affected. In other words, even if the dehydration rate was not acceptable, the cooking time may be slightly increased to achieve the desired dehydration rate.

The foregoing merely describes preferred embodiments of the present application, instead of limiting it in any way. While preferred embodiments of the present application have been disclosed above, they are not intended to limit the present application. Any persons skilled in the art may contemplate equivalent embodiments by making some alteration or modification to the disclosure without departing from the scope of the present application. However, any alteration, equivalent change and modification made without departing from the spirit of the present application shall fall within the scope of protection thereof.

What is claimed is:

1. A hot air cooking appliance comprising:
a base provided with a receiving chamber and a frying barrel disposed in the receiving chamber, the receiving chamber being defined by at least one wall, and the frying barrel being provided with a cooking chamber configured to receive food to be cooked and an opening causing the cooking chamber to open upwards, the base being provided with a heating element and an air supply fan capable of supplying and circulating hot air in the receiving chamber, the air supply fan achieving hot air circulation by means of the opening and the air in the cooking chamber such that food in the receiving chamber is heated and cooked by the hot air;
wherein the base is provided with an air exhaust port formed in the at least one wall and disposed distally from the air supply fan to reduce noise and oily fume emissions;
wherein a cooling gap is formed in the receiving chamber between the frying barrel and a wall of the at least one wall, the air exhaust port being in communication with the cooling gap, the cooling gap forming at least a portion of a flow path from the cooking chamber to the air exhaust port such that hot air traversing the flow path is cooled in the cooling gap; and,
wherein during cooking by the hot air cooking appliance, water vapor generated in the receiving chamber is discharged into the atmosphere through the cooling gap and the air exhaust port.

2. The hot air cooking appliance as defined in claim 1, further comprising:
an air exhaust box in communication with the air exhaust port such that the hot air exiting the air exhaust port passes through the air exhaust box to be discharged into the atmosphere;
wherein the air exhaust box is removably disposed below the receiving chamber.

3. The hot air cooking appliance of claim 1, wherein water vapor exiting the air exhaust port is discharged directly into the atmosphere.

4. The hot air cooking appliance as defined in claim 1, wherein:
the base comprises an upper portion located on an upper side of the receiving chamber and a lower portion located beneath a lower side of the receiving chamber, the receiving chamber being formed by the upper portion and lower portion jointly surrounding the receiving chamber;
the air supply fan is disposed in the upper portion,
an inner side of the upper portion being sealingly disposed;
the air exhaust port is disposed in the lower portion; and,
the heating element is also disposed in the upper portion.

5. The hot air cooking appliance as defined in claim 4, wherein:
the base is provided with a frying barrel inlet opening forwardly and in communication with the receiving chamber;
the frying barrel is configured as a drawer structure capable of being pushed into the receiving chamber from front to back through the frying barrel inlet; and,
a front end of the drawer structure and the frying barrel inlet are sealingly disposed.

6. The hot air cooking appliance as defined in claim 5, wherein:
the drawer structure is provided with a face panel disposed at the front end thereof;
the face panel is provided with a forward-facing appearance face provided with a handle to facilitate extraction and push of the drawer structure;
the face panel is provided with a backward-facing rear surface;
the base is provided with a forward-facing front surface disposed surrounding the frying barrel inlet; and,
once the drawer structure is pushed into the receiving chamber, the rear surface of the face panel and the front surface of the base are sealed, thereby achieving sealing between the front end of the drawer structure and the frying barrel inlet.

7. The hot air cooking appliance as defined in claim 6, wherein:
a sealing ring is disposed between the rear surface of the face panel and the front surface of the base; and, the sealing ring is fixed on the rear surface of the face panel.

8. The hot air cooking appliance as defined in claim 7, wherein:
a snap lock is disposed between both ends of the face panel and the two corresponding ends of the base to strengthen the seal setting.

9. The hot air cooking appliance as defined in claim 7, wherein
the drawer structure is provided with a first magnetic component;
the base is provided with a correspondingly matching second magnetic component; and,
once the drawer structure is pushed into the base, a magnetic attraction force between the first magnetic component and the second magnetic component is generated to maintain sealing between the front end of the drawer structure and the frying barrel inlet.

10. The hot air cooking appliance as defined in claim 5, wherein:
the base is provided with a slot disposed at the bottom thereof, with an air exhaust box extractable therefrom and insertable therein;
the air exhaust box is provided with a circuitous air exhaust passage disposed therein to facilitate cooling;

once the air exhaust box is inserted into the slot, the air exhaust port is in communication with the air exhaust passage such that the hot air generated in the cooking chamber can pass through the air exhaust port and the air exhaust passage to be discharged into the atmosphere;

the air exhaust box is formed by an upper air exhaust lid and a lower air exhaust lid assembled together;

the air exhaust passage is in the form of a horizontal ring and jointly surrounded by the upper air exhaust lid and the lower air exhaust lid; and, the upper air exhaust lid and the lower air exhaust lid can be disassembled to facilitate cleaning.

11. The hot air cooking appliance as defined in claim 10, wherein:

the lower air exhaust lid is provided with a water drainage hole disposed on the inner side of the circuitous air exhaust passage; and, a water storage box is provided beneath the air exhaust passage so that condensed water flowing through the water drainage hole flows into the water storage box.

12. An air fryer comprising:

a base provided with a receiving chamber and a frying barrel disposed in the receiving chamber, the receiving chamber being defined by at least one wall, and the frying barrel being provided with a cooking chamber configured to receive food to be cooked and an opening causing the cooking chamber to open upwards, the base being provided with a heating element and an air supply fan capable of supplying and circulating hot air in the receiving chamber, the air supply fan achieving hot air circulation by means of the opening and the air in the cooking chamber such that food in the receiving chamber is heated and cooked by the hot air;

wherein the base is provided with an air exhaust port formed in the at least one wall and disposed at a bottom of the receiving chamber, distally from the air supply fan to reduce noise and oily fume emissions;

wherein a cooling gap is formed in the receiving chamber between the frying barrel and a wall of the at least one wall, the air exhaust port being in communication with the cooling gap, the cooling gap forming at least a portion of a flow path from the cooking chamber to the air exhaust port such that hot air traversing the flow path is cooled in the cooling gap; and, wherein during the process of cooking by the hot air cooking appliance, water vapor generated in the receiving chamber is discharged into the atmosphere through the cooling gap and the air exhaust port.

13. The air fryer as defined in claim 12, further comprising:

an air exhaust box in communication with the air exhaust port such that the hot air exiting the air exhaust port passes through the air exhaust box to be discharged into the atmosphere;

wherein the air exhaust box is removably disposed below the receiving chamber.

14. The air fryer as defined in claim 13, wherein:

the base comprises an upper portion located on an upper side of the receiving chamber and a lower portion located beneath a lower side of the receiving chamber, the receiving chamber being formed by the upper portion and lower portion jointly surrounding the receiving chamber;

the air supply fan is disposed in the upper portion, an inner side of the upper portion being sealingly disposed;

the air exhaust port is disposed in the lower portion; and, the heating element is also disposed in the upper portion.

15. The air fryer as defined in claim 13, wherein:

the base is provided with a frying barrel inlet opening forwardly and in communication with the receiving chamber;

the frying barrel is configured as a drawer structure capable of being pushed into the receiving chamber from front to back through the frying barrel inlet; and, a front end of the drawer structure and the frying barrel inlet are sealingly disposed.

16. The air fryer as defined in claim 15, wherein:

the drawer structure is provided with a face panel disposed at the front end thereof;

the face panel is provided with a forward-facing appearance face provided with a handle to facilitate extraction and push of the drawer structure;

the face panel is provided with a backward-facing rear surface;

the base is provided with a forward-facing front surface disposed surrounding the frying barrel inlet; and, once the drawer structure is pushed into the receiving chamber, the rear surface of the face panel and the front surface of the base are sealed, thereby achieving sealing between the front end of the drawer structure and the frying barrel inlet.

17. The air fryer as defined in claim 15, wherein:

the base is provided with a slot disposed at the bottom thereof, with an air exhaust box extractable therefrom and insertable therein;

the air exhaust box is provided with a circuitous air exhaust passage disposed therein to facilitate cooling;

once the air exhaust box is inserted into the slot, the air exhaust port is in communication with the air exhaust passage such that the hot air generated in the cooking chamber can pass through the air exhaust port and the air exhaust passage to be discharged into the atmosphere;

the air exhaust box is formed by an upper air exhaust lid and a lower air exhaust lid assembled together;

the air exhaust passage is in the form of a horizontal ring and jointly surrounded by the upper air exhaust lid and the lower air exhaust lid; and, the upper air exhaust lid and the lower air exhaust lid can be disassembled to facilitate cleaning.

18. The air fryer as defined in claim 17, wherein:

the lower air exhaust lid is provided with a water drainage hole disposed on the inner side of the circuitous air exhaust passage; and, a water storage box is provided beneath the air exhaust passage so that condensed water flowing through the water drainage hole flows into the water storage box.

19. The air fryer as defined in claim 12, wherein an inner side of the receiving chamber proximal to the air supply fan is sealingly disposed.

20. The air fryer of claim 12, wherein water vapor exiting the air exhaust port is discharged directly into the atmosphere.

* * * * *